Nov. 30, 1937.  R. C. BENDER  2,100,309
RETURNABLE SHIPPING CONTAINER
Original Filed Sept. 29, 1934
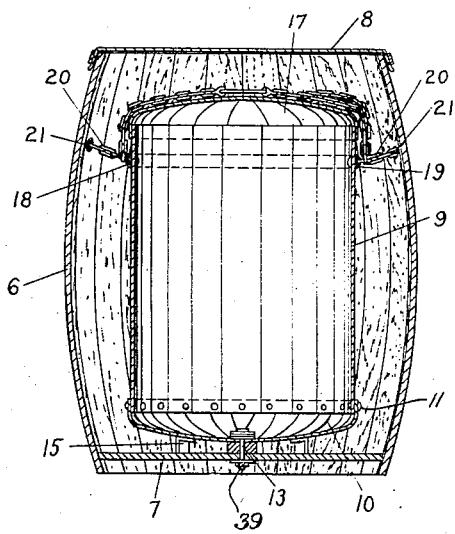
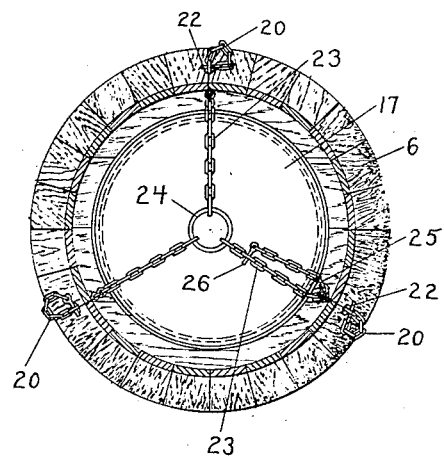
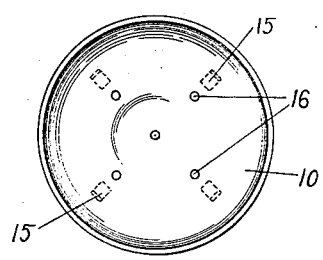
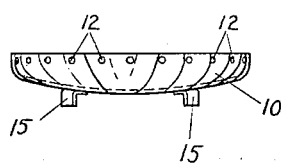
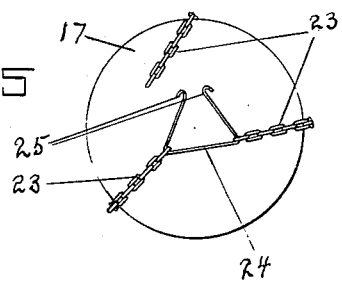
INVENTOR.
Robert C. Bender,
BY Walter N. Haskell,
his ATTORNEY.

Patented Nov. 30, 1937

2,100,309

UNITED STATES PATENT OFFICE 2,100,309

RETURNABLE SHIPPING CONTAINER

Robert C. Bender, Davenport, Iowa

Original application September 29, 1934, Serial No. 746,069. Divided and this application May 14, 1936, Serial No. 79,657

3 Claims. (Cl. 217—72)

My invention has reference to a returnable shipping container, and relates more specially to improvements on an apparatus of that kind on which Letters Patent of the United States have been issued to me on Aug. 14, 1934, numbered 1,970,413, and May 28, 1935, numbered 2,002,625. The present application was divided out of the application for the last named patent.

The present invention involves a construction similar in character to those set forth in said patents, with an outer receptacle and inner container, and spaces between the two for refrigerating materials. In the present improvement the inner container is formed of metal throughout, is of cylindrical form, and is provided with top and bottom closures which are identical in shape and size, and which can be used interchangeably as a bottom piece or cover for the container. The means for holding the container in desired position and for securing the cover in place consists of a novel arrangement of chains, specially adapted for use with a container of the kind mentioned.

Other features and advantages of the invention will more fully appear from the following specification, taken in connection with the accompanying drawing, in which:—

Fig. 1 is a vertical section of the invention on the broken line 1—1 of Fig. 2.

Fig. 2 is a cross-section on the line 2—2 of Fig. 1.

Fig. 3 is a detail of the bottom plate 10 in plan view.

Fig. 4 is a side view thereof.

Fig. 5 shows a modified arrangement of the cover locking means.

As mentioned in said former patents, the invention has to do chiefly with the transportation of fish and other perishable property requiring refrigeration in transit, as by an ice pack, and occasional renewal of the refrigerant on long hauls.

As shown in Figures 1 and 2, the device includes an outer container or barrel 6, fitted with a bottom 7, and closed at the top by a cover 8, preferably of fabric material, and held in place by means detachably connected with the receptacle, such as a hoop. Centrally of the receptacle 8 is a commodity container 9, formed entirely of sheet metal, and provided at its lower end with a bottom section 10, of dished formation, and rigidly held in place by means of rivets 11, secured in openings in the flanged portion of said bottom section and corresponding openings in the lower end of the container 9.

The bottom plate 10 is held in place by means of a bolt 13, passing through openings centrally of said parts, and held in place by a nut 39 on the threaded end of said bolt. The inner container is thereby anchored in place at its lower end. The bottom plate is also provided with feet 15, providing a space between the lower end of the container and bottom of the receptacle 6. Perforations 16 are also provided in the bottom plate 10 to allow for drainage. Similar openings are usually formed in the bottom of the outer receptacle.

The container 9 is also fitted with a cover 17, similar in shape and size with that of the bottom plate 10, and capable of being used interchangeably therewith. When used as a cover the feet 15 and perforations can be omitted if desired.

The container 9 is also fitted with a ring 18 on the outside thereof, adjacent to the lower edge of the cover, and secured to the container by eye-bolts 19, with which are connected chains 20, passing through openings 21 in the walls of the container 6, and adapted to be held in place by pins 22, on the ends of said chains. Connected with the chains 20 are other chain sections 23, extending above the cover 17 and attached at a central point to a ring 24, by means of which the cover is secured from accidental release. This part of the device is provided with a release means consisting of a loop 25 on the end of one of the chains 23, provided at the end with a pin 26, for engagement with one of the links of the chain. When it is desired to remove the cover 17 the loop 25 is disconnected from the chain and the chains 23 and ring 24 moved to one side of the cover, without disconnecting the other chains.

By means of the chains 20 the container 9 can be properly positioned to provide a uniform amount of space between the same and the outer container, and when in use the chains 23 can be quickly displaced to permit removal of the cover 17 for placing commodities in the container or removing the same. By detaching the chains 20 and releasing the bolt 13 the inner container can be quickly removed from the outer receptacle for any purpose.

In Fig. 5 is shown another arrangement of chains, wherein the loop 25 is eliminated, and three similar chains 23 are united by a triangular wire member 24, replacing the ring 24, and provided at its end with hooks 25 for engagement with the end link of one of said chains. By disconnecting the last named chain the other chains can be dislodged from the cover 17 as in the other case. The ends of the member 24 can be secured by a metal seal, if desired, to prevent the purloining of the contents of the container.

What I claim, and desire to secure by Letters Patent, is:

1. A shipping package, comprising an outer container, an inner cylindrical container, including a dish-shaped bottom provided with openings for drainage, a cover of inverted dish-shape for said container, similar to said bottom and adapted for interchangeable use therewith, means for holding said bottom and the bottom of the outer container in spaced relation, means for detachable connection of the bottom of the inner container with the bottom of the outer container, and connections between the upper end of the inner container capable of adjustment to conform with the spacing between said containers.

2. A shipping package comprising an outer container, provided near its top with openings for the passage of chains, an inner container of metal construction, provided with a top and bottom of corresponding dish-shaped construction, and usable interchangeably, means for anchorage of the bottom of the inner container with the bottom of the outer container, a band fixed to said inner container near its upper end, chains connected with said band and passing through said openings in the outer container, means for locking said chains to said outer container, and auxiliary chains passing over the cover of the container from said first-named chains and forming a seal for said cover.

3. In a shipping package, an outer container, an inner container anchored in said outer container in spaced relation, detachable means for holding the upper part of said inner container in proper spaced relation with the outer container, a cover supported detachably on said inner container, and a set of chains connected with said inner container, passing over said cover and holding the same in place, one of said chains being detachably connected and removable to permit displacement of said chains.

ROBERT C. BENDER.